United States Patent
Linortner et al.

(10) Patent No.: US 8,151,965 B2
(45) Date of Patent: Apr. 10, 2012

(54) CLUTCH ARRANGEMENT

(75) Inventors: Thomas Linortner, Graz (AT); Martin Parigger, Eggersdorf (AT); Simon Kaimer, Heiligenkreuz (AT); Franz Gratzer, Stallhofen (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 804 days.

(21) Appl. No.: 12/190,164

(22) Filed: Aug. 12, 2008

(65) Prior Publication Data
US 2009/0045027 A1 Feb. 19, 2009

(30) Foreign Application Priority Data
Aug. 13, 2007 (DE) .................. 10 2007 038 156

(51) Int. Cl.
*F16D 25/02* (2006.01)
(52) U.S. Cl. .................. 192/85.02; 192/103 F; 192/82 T
(58) Field of Classification Search ............... 192/85.02, 192/103 F, 85.63
See application file for complete search history.

(56) References Cited

U.S. PATENT DOCUMENTS

| | | | |
|---|---|---|---|
| 5,310,388 A | 5/1994 | Okcuoglu et al. | |
| 5,704,863 A | 1/1998 | Zalewski et al. | |
| 6,041,903 A | 3/2000 | Burns et al. | |
| 6,076,646 A | 6/2000 | Burns | |
| 6,112,874 A | 9/2000 | Kopp et al. | |
| 6,315,097 B1 | 11/2001 | Burns | |
| 6,330,928 B1 * | 12/2001 | Sekiya et al. | 180/242 |
| 6,454,068 B2 * | 9/2002 | Arai et al. | 192/35 |
| 6,533,095 B2 | 3/2003 | Mohan et al. | |
| 6,578,685 B2 | 6/2003 | Porter | |
| 6,578,692 B2 | 6/2003 | Porter | |
| 6,745,879 B1 | 6/2004 | Dolan | |
| 6,789,658 B2 * | 9/2004 | Busold et al. | 192/103 F |
| 7,059,460 B2 * | 6/2006 | Duan et al. | 192/70.12 |
| 7,306,170 B1 * | 12/2007 | Maksymec | 239/201 |

FOREIGN PATENT DOCUMENTS

| | | |
|---|---|---|
| DE | 19927079 A1 | 12/2000 |
| DE | 10028861 A1 | 12/2001 |
| DE | 10153758 A1 | 6/2002 |
| DE | 19854867 B4 | 1/2008 |

* cited by examiner

*Primary Examiner* — David D Le
*Assistant Examiner* — Jude Agendia
(74) *Attorney, Agent, or Firm* — Harness, Dickey & Pierce, P.L.C.

(57) ABSTRACT

A clutch arrangement having an input element and an output element that are rotatable relevant to one another, a friction clutch and a pump. The friction clutch couples the input element with the output element in dependence on a hydraulic pressure in a pressure space of the clutch arrangement. The pump has a first pump part that is rotationally fixedly connected to the input element and a second pump part that is rotationally fixedly connected to the output element. The pump may be driven by a rotary movement of the input element and the output element relative to one another, with a pressure side of the pump being connected to the pressure space. An orifice having a substantially temperature independent leakage characteristic is arranged in a leakage line that leads from the pressure space to a low pressure space and which extends parallel to the pump.

24 Claims, 5 Drawing Sheets

CLUTCH ARRANGEMENT

CROSS-REFERENCE TO RELATED APPLICATIONS

This application claims the benefit and priority of German Patent Application No. 10 2007 038 156.7, filed Aug. 13, 2007. The entire disclosure of the above application is incorporated herein by reference.

FIELD

The present disclosure relates to a clutch arrangement responsive to a speed difference for the transmission of a torque in a powertrain of a motor vehicle.

BACKGROUND

This section provides background information related to the present disclosure which is not necessarily prior art.

A clutch arrangement may serve in a motor vehicle with all-wheel drive, for example, in dependence on a difference in speed between a permanently driven primary axle and a driven secondary axle, which can be switched in, to transmit the driving torque of a drive unit to the secondary axle. In other applications, a clutch arrangement may serve as a replacement of an axle differential for the transmission of a driving torque to a half-shaft of an axle, as a block for a longitudinal differential of an all-wheel driven vehicle, or as a block for an axle differential.

The clutch arrangement has an input element and an output element that may be rotated relative to one another (e.g., an input shaft and an output shaft). The clutch arrangement furthermore has a friction clutch by which the input element and the output element may be operably effectively coupled to one another (e.g., to drive the output element by means of the input element to make a rotary movement or to brake it). The friction clutch is effective in dependence on a hydraulic pressure that prevails in a pressure space of the clutch arrangement. In addition, the clutch arrangement has a hydraulic pump with a first pump part that is rotationally fixedly connected to the named input element and with a second pump part that is rotationally fixedly connected to the named output element. The pump is driven by a rotary movement of the input element and of the output element relative to one another. The suction side of the pump is connected to a low pressure space, (i.e., to a space in which a lower pressure prevails than in the aforesaid pressure space of the clutch arrangement). The pressure side of the pump is connected to the pressure space.

When a speed difference is present between the input element and the output element of the clutch arrangement, the pump is driven such that hydraulic fluid is conveyed into the pressure space of the clutch arrangement to actuate the friction clutch. A friction locking coupling is hereby effected between the input element and the output element of the clutch arrangement, which in turn contributes to a reduction in the speed difference between the input element and the output element and, thus, to a reduced pump power.

The pump may have an inner leakage in dependence on the specific design (i.e., hydraulic fluid can move from the pressure space through the pump into the low pressure space). The pump power is, thus, reduced in accordance with the leakage rate. Since the viscosity of the hydraulic fluid is typically temperature dependent, the leakage rate and thus the pump power are also dependent on the temperature of the hydraulic fluid. This effect results in an undesirably high temperature dependence of the clutch characteristic which characterizes the dependence of the torque transmitted by the clutch arrangement on the speed difference between the input element and the output element.

A clutch arrangement of the above type is known from U.S. Pat. No. 5,310,388 in which a control valve is arranged at a pump outlet and has a bimetallic strip that releases or closes the pump outlet in dependence on the temperature of the hydraulic fluid. The temperature dependence of the viscosity of the hydraulic fluid is thereby compensated. This kind of temperature compensation is, however, undesirably complex and/or costly.

SUMMARY

This section provides a general summary of the disclosure, and is not a comprehensive disclosure of its full scope or all of its features.

The present disclosure provides a clutch arrangement for the transmission of a torque in a motor vehicle that has a reduced temperature dependence of the clutch characteristic with a small construction effort and/or cost.

The clutch arrangement may have an orifice having a substantially temperature independent leakage characteristic arranged at a leakage line that leads from the pressure space of the clutch arrangement to the low pressure space, and in so doing extends parallel to the pump.

The leakage line may be arranged parallel to the pump conveying hydraulic fluid from the low pressure space into the pressure space, wherein the leaking line deliberately permits a constant leakage of hydraulic fluid from the pressure space into the low pressure space. This leakage may be pressure dependent. It is, however, important that the leakage rate (leakage volume/time) at the leakage line be substantially independent of the temperature of the hydraulic fluid. The temperature dependence of the leakage rate of the pump may hereby be relativized so that a temperature dependence of the clutch characteristic is reduced.

Sufficient independence of the leakage rate from the temperature is achieved by the orifice arranged in the leakage line. Unlike a throttle, for example, the orifice allows a turbulent flow of the hydraulic fluid passing through the orifice so that the flow resistance is hardly temperature dependent.

The flow rate Q (=volume per time, $\Delta V/\Delta t$) of a turbulent flow through an orifice may be calculated as follows:

$$Q = \alpha \cdot A \cdot \sqrt{\frac{2 \cdot \Delta p}{\rho}}$$

where $\alpha$ is the drag coefficient, A is the area of the opening cross-section, $\rho$ is the density of the fluid, and $\Delta p$ is the pressure difference. The drag coefficient $\alpha$ is a dimensionless constant that depends on the geometry of the orifice. It amounts to approximately 0.6 for a sharp orifice. This corresponds to a resistance coefficient $\zeta = 1/\alpha^2$ of approximately 2.7 to 2.8.

In contrast, the flow rate Q of a throttle in the model of a laminar flow through a pipe in accordance with the Hagen-Poiseuille law amounts to:

$$Q = \frac{\pi \cdot r^4}{8 \cdot \eta \cdot l} \cdot \Delta p$$

where r is the radius of the opening cross-section, $\eta$ is the dynamic viscosity of the fluid, l is the length of the pipe or of the throttle, and $\Delta p$ is the pressure difference. Since the dynamic viscosity $\eta$ of the usually used hydraulic fluid is temperature dependent, the rate Q of a throttle is also temperature dependent.

The pump used in the clutch arrangement may be overdimensioned to compensate for the leakage of hydraulic fluid by the leakage line.

The above-described clutch arrangement having a temperature dependence of the clutch characteristic that is greatly reduced results in a small construction effort and/or cost. The orifice is a simple, cost-effective component with a small proneness to faults. The orifice, in addition, effects an advantageous damping on a transition between different clutch characteristics, in particular on a transition from a steep characteristic (with a closed leakage) to a medium characteristic (with an open leakage line) so that a switch between these coupling characteristics may be made substantially free of jolts. The orifice connected in parallel to the pump furthermore effects a defined outflow of the hydraulic fluid from the pressure space such that simple pressure models may be used for switching between the different characteristics.

The leakage line with the orifice arranged therein may have a leakage rate that approximately corresponds to the leakage rate of the pump at the operating temperature of the hydraulic fluid (i.e., when the inner pump leakage is comparatively high). The temperature dependence of the pump leakage and thus the temperature dependence of the coupling characteristic are hereby considerably reduced. A suitable leakage rate of the leakage line with the orifice is, for example, in the range from approximately 0.4 to 0.9 l/min (liters per minute), with a pressure difference of approximately 10 bar.

The orifice arranged in the leakage line may have an opening passage that has an inner diameter in a range from approximately 0.4 mm to 0.8 mm and a length in a region of approximately 0.2 mm to 0.5 mm. A suitable leakage rate that is substantially independent of the temperature of the hydraulic fluid results in dependence on the pressure of the hydraulic fluid.

A particularly simple and cost-effective realization of the orifice results when it is formed by a bore in a thin disk that is inserted into the leakage line and that extends perpendicular to the flow direction of the hydraulic fluid. The disk may be made of metal since particularly sharp transitions or edges may be formed at a peripheral boundary of the bore to generate the desired turbulent flow.

Alternatively, the orifice may be formed by a bore in a base section of a substantially beaker-shaped insert inserted into the leakage line. Such an insert may be made in a simple and cost-effective manner as a deep-drawn part of metal, and such an insert may also be easily fastened within the leakage line. The base section may extend substantially perpendicular to the flow direction of the hydraulic fluid.

The disk or the base section of the beaker-shaped insert may have a thickness of approximately 0.2 mm to 0.5 mm.

A drain line may be provided for the hydraulic fluid that leads from the pressure space of the clutch arrangement to the low pressure space and may extend parallel to the leakage line, with a controllable drain valve being arranged at the drain line to be able to selectively open or close the drain line. A fast opening of the friction clutch and thus a fast decoupling of the output element from the input element of the clutch arrangement is possible by opening the drain valve. The drain valve may be formed as a poppet valve, with the poppet valve in particular being made as an electrically controllable magnetic valve.

Alternatively or additionally to the drain valve, the clutch arrangement may have an excess pressure valve that is arranged at an excess pressure line that extends from the pressure space of the clutch arrangement to the low pressure space. The excess pressure valve is thus arranged parallel to the orifice of the leakage line as well as parallel to the drain valve. In contrast to the active control of the drain valve, the excess pressure valve may serve for the passive securing of the clutch arrangement against a hydraulic excess pressure in the pressure space of the pump or of the friction clutch.

A switch valve may be arranged at the leakage line—and in series with the orifice—by which the leakage line may be selectively opened or closed. The continuous leakage flow through the leakage line may thus be interrupted by closing the leakage line by means of this switch valve whereby ultimately an additional, comparatively steep, characteristic is set. A stiffer (i.e. steeper) clutch characteristic may thus be selected directly in dependence on measured driving condition parameters (e.g. vehicle speed, wheel speed differences) or by actuation of a corresponding selection switch. The clutch characteristic resulting on the closing of the leakage line may no longer be temperature compensated since the directly induced leakage is interrupted by the orifice. However, an extremely steep clutch characteristic may be set by closing the leakage line, where the characteristic signifies a maximum traction and tensioning of the powertrain so that a temperature compensation may be omitted with this characteristic. The switch valve may likewise be made as a poppet valve, and, for example, as an electrically controllable magnetic valve.

A control device may preferably be associated with the clutch assembly and may either be part of the clutch arrangement or be made separately therefrom.

On the presence of the switch valve at the leakage line, the control device may generally be made to open the switch valve to set a mean clutch characteristic at which an average torque is transmitted on a given speed difference between the input element and the output element of the clutch arrangement and which has an orifice-like pressure drop on a speed difference of zero or to close the switch valve to set a clutch characteristic that is steeper than the aforesaid characteristic so that a higher torque may be transmitted by the clutch arrangement at the same given speed difference between the input element and the output element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
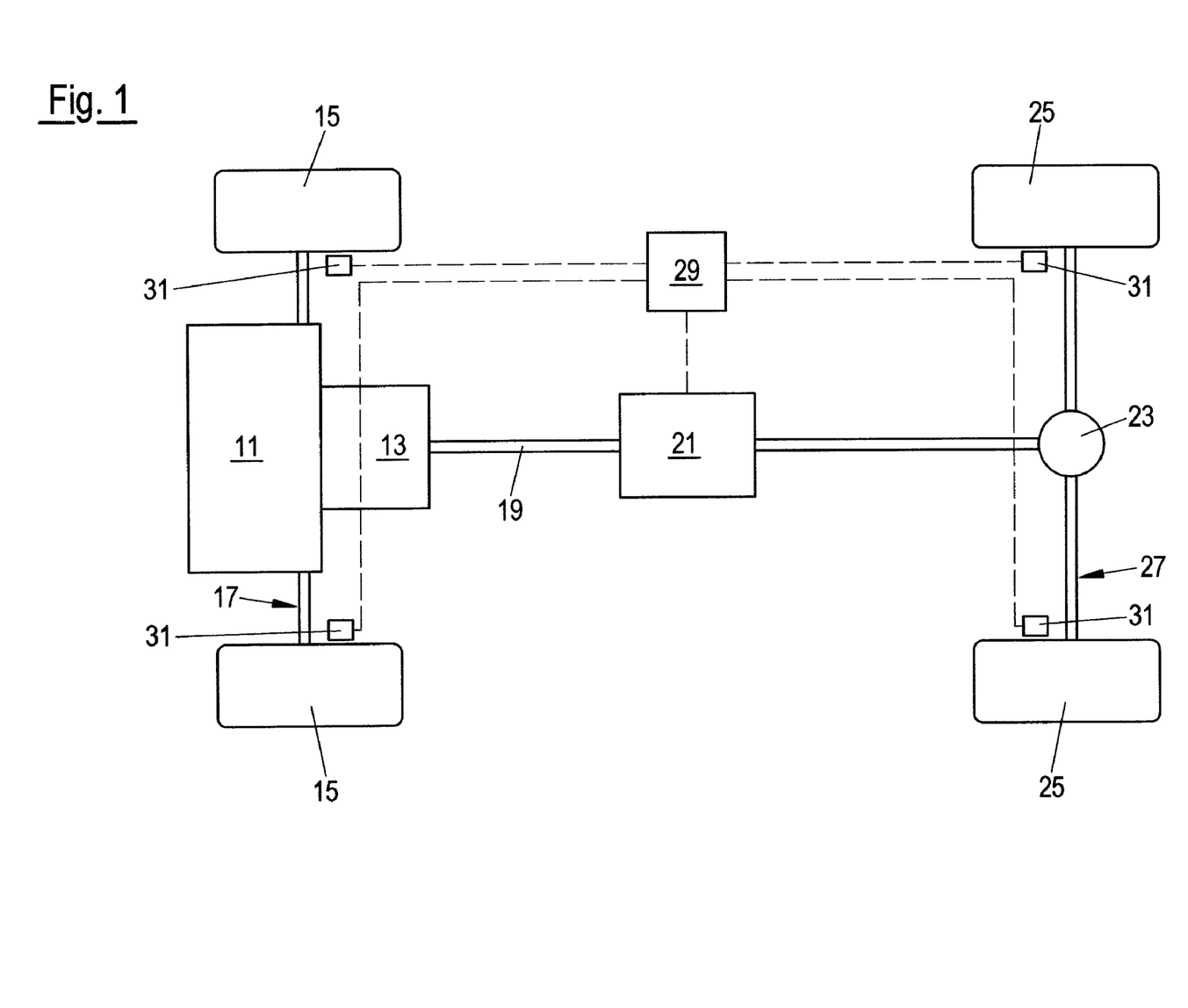
FIG. 1 shows a powertrain of a motor vehicle with a clutch arrangement.

FIG. 1 schematically illustrates a powertrain of a motor vehicle. An engine 11 drives two wheels 15 of a front axle 17 via a transmission unit 13 and a front axle differential gear (not shown). Front axle 17 thus forms a primary axle. In addition, engine 11 drives two wheels 25 of a rear axle 27 via transmission unit 13, a Cardan shaft 19, a clutch arrangement 21, and a rear axle differential gear 23. Rear axle 27 in this respect forms a secondary axle of the vehicle. An electronic control unit 29 of the vehicle is connected at the input side to four wheel speed sensors 31 that are associated with front wheels 15 and rear wheels 25. Control unit 29 may optionally be connected to further sensors (e.g., to a steering angle sensor, a yaw rate sensor, etc. (not shown)). Control unit 29 may be connected to clutch arrangement 21 at the output side. Clutch arrangement 21 may serve to transmit some of the driving torque of engine 11 to rear axle 27, and indeed in dependence on control signals of control unit 29. The vehicle is all-wheel driven provided that a driving torque is transmitted to rear axle 27 via clutch arrangement 21. Clutch arrangement 21 may also be provided at a different position of the powertrain (e.g., at transmission unit 13 or at rear axle differential gear 23).

Figure 2:
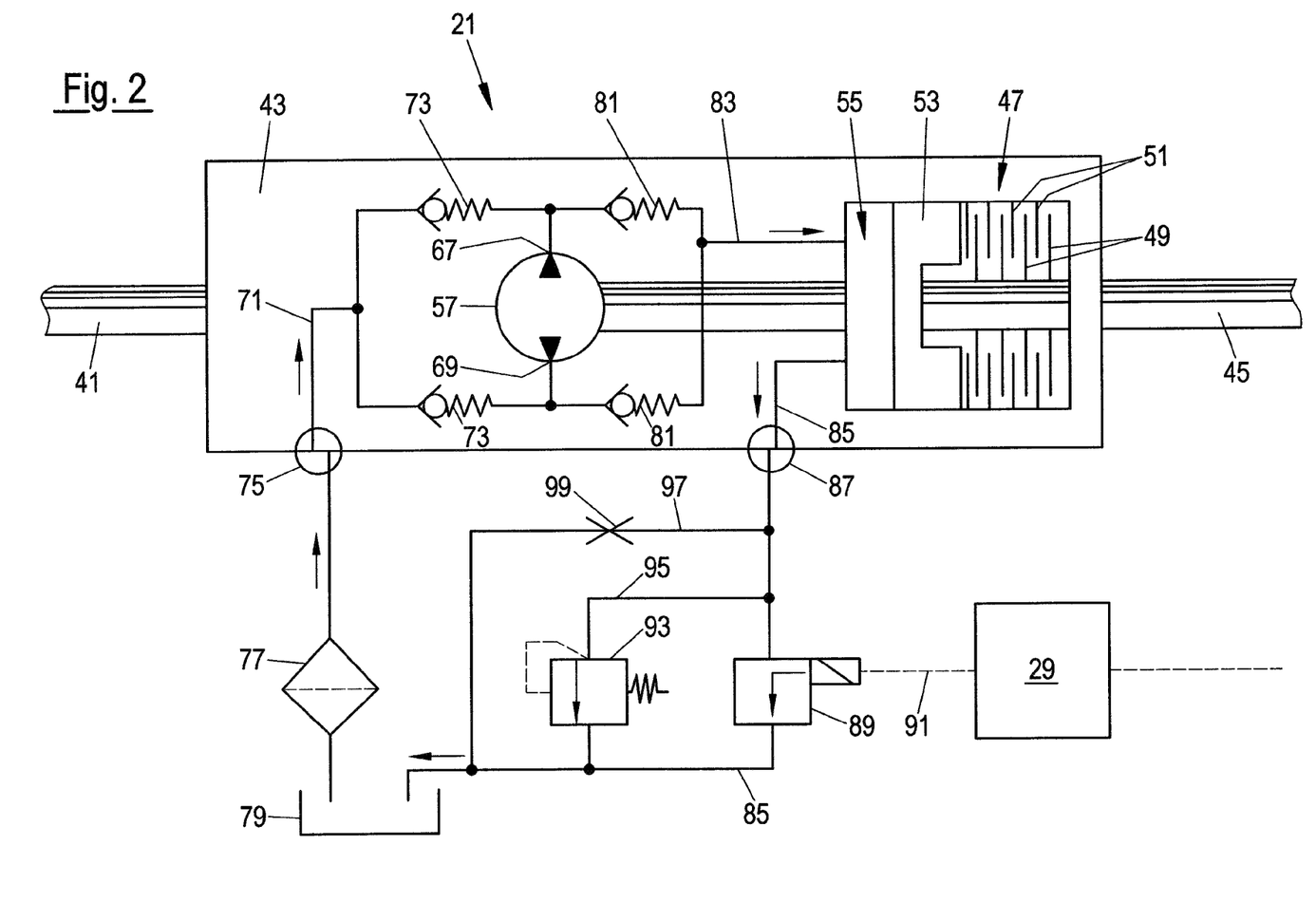
FIG. 2 shows a first embodiment of a clutch arrangement.

FIG. 2 schematically shows a first configuration of the clutch arrangement 21. Clutch arrangement 21 has an input shaft 41 that is rotationally fixedly connected to a rotatable inner housing 43 of clutch arrangement 21 and an output shaft 45 that is rotatable relative to input shaft 41. Input shaft 41 and output shaft 45 are rotatably supported at a stationary outer housing of clutch arrangement 21 (not shown). Clutch arrangement 21 furthermore has a friction clutch 47 with a plurality of internal disks 49 and a plurality of external disks 51 in an alternating arrangement. Internal disks 49 are axially displaceable, but rotationally fixedly connected to output shaft 45. External disks 51 are axially displaceable, but rotationally fixedly connected to inner housing 43 (and thus also to input shaft 41). Friction clutch 47 furthermore has a ring-shaped, axially displaceable pressure piston 53 whose front side selectively presses internal disks 49 and external disks 51 against one another to transmit a torque from input shaft 41 to output shaft 45. The rear side of pressure piston 53 faces a hydraulic pressure space 55.

Clutch arrangement 21 furthermore has a pump 57. It may be driven by a rotary movement of input shaft 41 and output shaft 45 relative to one another and in so doing generates a hydraulic pressure in pressure space 55 to move pressure piston 53 in the engagement sense of friction clutch 47. Pump 57 may generally be any desired hydraulic pump responsive to a speed difference, in particular a circulating compressor or a stroke compressor. Pump 57 may also be a gerotor pump whose structure will be explained below with reference to FIG. 3.

Figure 3:
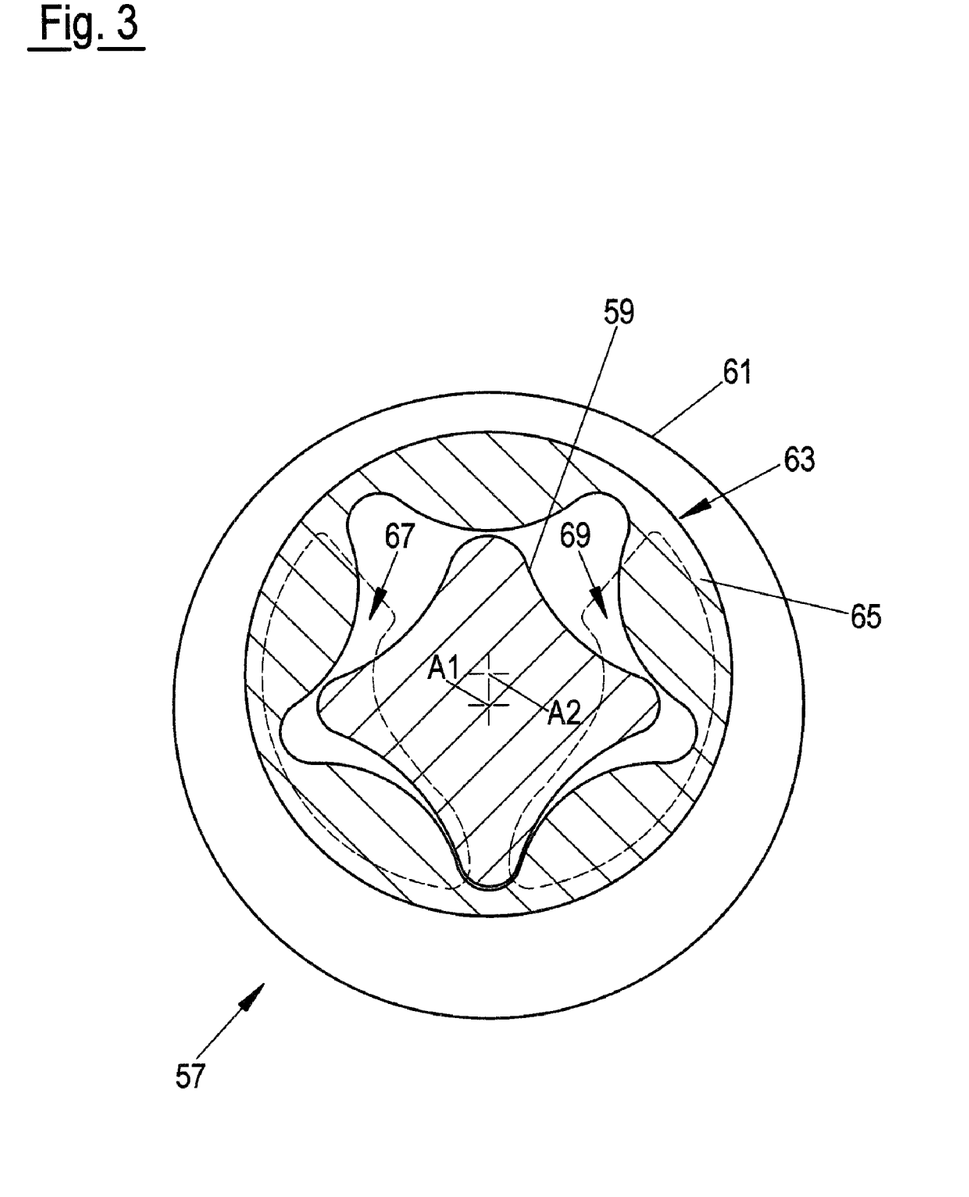
FIG. 3 shows a cross-sectional view of a gerotor pump.

FIG. 3 shows a cross-sectional view of a gerotor pump 57 in accordance with FIG. 2. Pump 57 may have an internal runner 59 that is rotationally fixedly connected to output shaft 45 in accordance with FIG. 2 and rotates around an axis A1. Pump 57 furthermore may have a ring section 61 that is rotationally fixedly connected to the pump housing (not shown) as well as to inner housing 43 of clutch arrangement 21 in accordance with FIG. 2 and accordingly also to input shaft 41. In this respect, ring section 61 likewise rotates around axis A1. Ring section 61 has a circular cut-out 63 whose center is offset with respect to axis A1. In addition, pump 57 may have an external runner 65 that is rotatably supported around an axis A2 in cut-out 63 of ring section 61, which surrounds internal runner 59 and contacts it. Internal runner 59 may have an outer toothed arrangement and external runner 65 may have an inner toothed arrangement, with the number of teeth of outer runner 65 being at least one tooth larger than the number of teeth of internal runner 59.

In addition, a first connection opening 67 and a second connection opening 69 may be recognized in FIG. 3, which are formed at a section of the pump housing which is axially offset with respect to the cross-sectional plane shown in FIG. 3. Depending on the sense of rotation of internal runner 59 relative to ring section 61, first connection opening 67 may serve as a pump inlet and second connection opening 69 may serve as a pump outlet, or vice versa.

Provided that internal runner 59 rotates relative to ring section 61 and connection openings 67 and 69, internal runner 59 conveys hydraulic fluid, provided at one of the connection openings 67 and 69, in the peripheral direction to the other connection opening 69 or 67. This is due to hydraulic fluid being enclosed in a gap that is formed between internal runner 59 and external runner 65. Since the volume of this gap varies during the rotation of internal runner 59, the hydraulic fluid is sucked in from the one connection opening 67 or 69 and expelled into the other connection opening 69 or 67. The change in the volume of the respective gap during the rotation of internal runner 59 is in turn due to internal runner 59 driving external runner 65 to make a rotary movement, with different rotational speeds being adopted due to the different number of teeth (i.e., external runner 65 rotating around axis A2 rotates more slowly than internal runner 59).

Referring again to FIG. 2, connection openings 67 and 69 of pump 57 are also shown here which were explained in connection with FIG. 3. An intake line 71 is associated with pump 57. It is connected to the two connection openings 67 and 69 of the pump 57 via a respective one of two check valves 73 at a suction side. Intake line 71 is connected against the flow direction of the hydraulic fluid via a rotary leadthrough 75 and an oil filter 77 to a pump sump 79. Oil filter 77 and sump 79 are arranged in the stationary outer housing of clutch arrangement 21. At the pressure side, pump 57 is connected via two check valves 81 to a pressure line 83 that leads to pressure space 55 of clutch arrangement 21. The hydraulic fluid flow from pressure space 55 via a drain line 85 and a further rotary leadthrough 87 to sump 79, as will be explained below.

Pump 57 is driven relative to the pump housing with ring section 61 by a rotary movement of internal runner 59 (FIG. 3), corresponding to a rotation of input shaft 41 relative to output shaft 45 (FIG. 2). With reference to FIG. 1, this means that pump 57 conveys hydraulic fluid when a speed difference is present between wheels 15 of front axle 17, on the one hand, and wheels 25 of rear axle 27, on the other hand.

Depending on whether input shaft 41 rotates faster or slower than output shaft 45, the hydraulic fluid is sucked in via one of check valves 73 and conveyed into pressure space 55 via one of check valves 81 (FIG. 2). Due to the hydraulic pressure hereby building up in pressure space 55, pressure piston 53 is moved in the direction of disks 49 and 51 of friction clutch 47 to bring disks 49 and 51 into increasing friction locking. Input shaft 41 and output shaft 45 are hereby coupled to one another to an increasing degree in a rotationally effective manner such that a drive torque is transmitted from input shaft 41 via clutch arrangement 21 to output shaft 45. Since a stronger coupling of output shaft 45 to input shaft 41 contributes to a reduction in the speed difference, clutch arrangement 21 acts in a self-regulating manner.

Actuation of friction clutch 47 on the presence of a speed difference between input shaft 41 and output shaft 45 only occurs, however, when hydraulic pressure space 55 is closed sufficiently tightly. In contrast, to be able to selectively deactivate clutch arrangement 21, a drain valve 89 may be arranged along drain line 85. Drain valve 89 may be made as a magnetic valve that is controlled by control unit 29 via an electrical control line 91. If drain valve 89 is closed, clutch arrangement 21 may couple output shaft 45 to input shaft 41 in self-regulating manner. If, in contrast, drain valve 89 is open, the hydraulic fluid conveyed into pressure space 55 may escape via drain line 85 into sump 79 so that only a small driving torque is transmitted from input shaft 41 to output shaft 45, even on the presence of a speed difference between input shaft 41 and output shaft 45.

Drain valve 89 may be arranged in the stationary outer housing of clutch arrangement 21. An excess pressure valve 93 may optionally be arranged parallel to drain valve 89 at an excess pressure line 95. The maximum possible hydraulic pressure in pressure space 55 is hereby limited, for example, in the case of a malfunction of drain valve 89.

Figure 4:
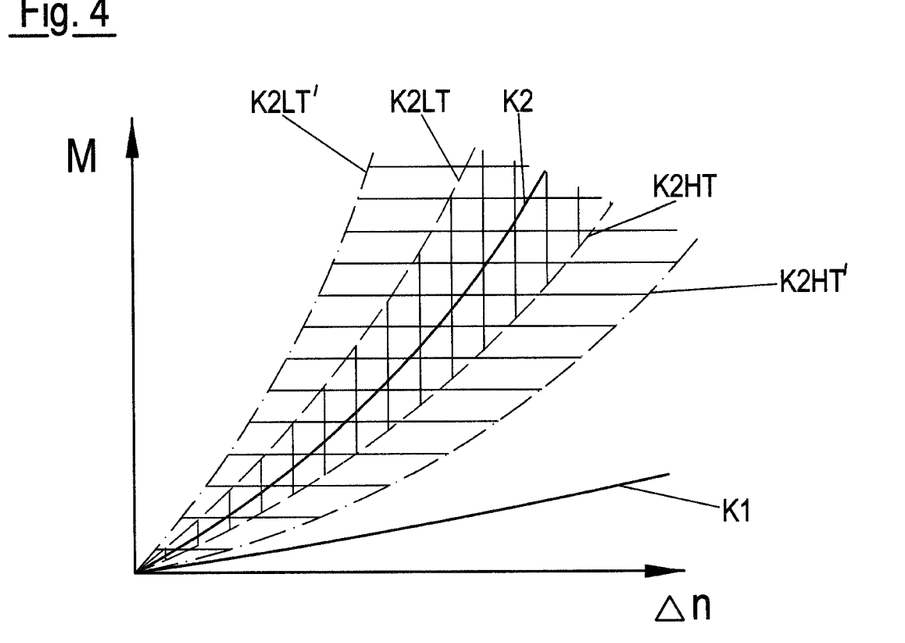
FIG. 4 shows the clutch characteristics which can be set with an embodiment in accordance with FIG. 2.

The torque transmission characteristic of clutch arrangement 21 in accordance with FIG. 2 will be explained in the following with reference to FIG. 4. FIG. 4 shows the curves of a plurality of clutch characteristics, that is the dependence of the transmitted torque M on the speed difference Δn between input shaft 41 and output shaft 45 of clutch arrangement 21.

A very flat clutch characteristic K1 is first shown in FIG. 4. It characterizes the torque transmission with open drain valve 89. In this case, only drag torques are transmitted by friction clutch 47 even with large speed differences Δn since the hydraulic fluid conveyed by pump 57 into pressure space 55 may escape into sump 79 via drain line 85. No real hydraulic pressure may be built up in pressure space 55 in this respect. The driving torque is thus only transmitted to the primary axle of the vehicle (2WD operation). This characteristic K1 is set, for example, for the shunting of the vehicle.

A further clutch characteristic K2 is furthermore shown in FIG. 4, which is considerably steeper than the characteristic K1 and which has a progressive extent. The clutch characteristic K2 generally corresponds to the state in which drain valve 89 is closed so that, on the presence of a speed difference between input shaft 41 and output shaft 45, a significant pressure may be built up in pressure space 55 to actuate friction clutch 47 by means of pressure piston 53. An increasing torque M is thus transmitted from input shaft 41 to output shaft 45 with an increasing speed difference Δn (4WD operation).

However, only an idealized curve of the clutch characteristic K2 is shown in FIG. 4. It must actually be taken into account that pump 57 is characterized by an inner pump leakage. The leakage rate of pump 57 is also highly temperature dependent due to the temperature dependence of the viscosity of the hydraulic fluid. A characteristic field is thus actually associated with the explained clutch characteristic K2, which generally extends from a curve K2LT' (for low temperatures corresponding to a small leakage rate) up to a curve K2HT' (for high temperatures corresponding to a high leakage rate). Without suitable counter-measures, the explained clutch characteristic K2 (in accordance with closed drain valve 89) may, therefore, vary in a range that extends between the two curves K2LT' and K2HT' and which is marked by horizontal hatching in FIG. 4.

This great temperature dependence of the characteristic curve with an activated clutch arrangement 21 is unwanted since a very different characteristic of the torque transmission and thus of the performance of the vehicle results in dependence on the temperature of the hydraulic fluid in clutch arrangement 21.

To reduce this temperature dependence in a simple manner and with a low effort and/or cost, an additional leakage of the hydraulic fluid from pressure space 55 is effected directly by means of an orifice having a substantially temperature independent leakage characteristic in order to compensate the temperature dependence of the leakage rate of pump 57. For this purpose, such an orifice 99 may be arranged at a leakage line 97 which extends parallel to pump 57 from pressure space 55 to sump 79 (FIG. 2). The desired temperature independence of the leakage rate of orifice 99 is based on the fact that—unlike a throttle—the orifice opening generates a turbulent flow so that the volume flow essentially only depends on the pressure of the hydraulic fluid in the temperature ranges relevant here. Orifice 99 is located, for example, in the stationary outer housing of clutch arrangement 21.

The effect of orifice 99 is likewise shown in FIG. 4. The coupling characteristic K2 with closed drain valve 89 and open leakage line 97 with orifice 99 now only varies in a range between a curve K2LT (for low temperatures) and a curve K2HT (for high temperatures). This range is characterized by a vertical hatching. The thus resulting temperature dependence of the clutch characteristic K2 is reduced to an acceptable degree by the provision of orifice 99.

Figure 5:
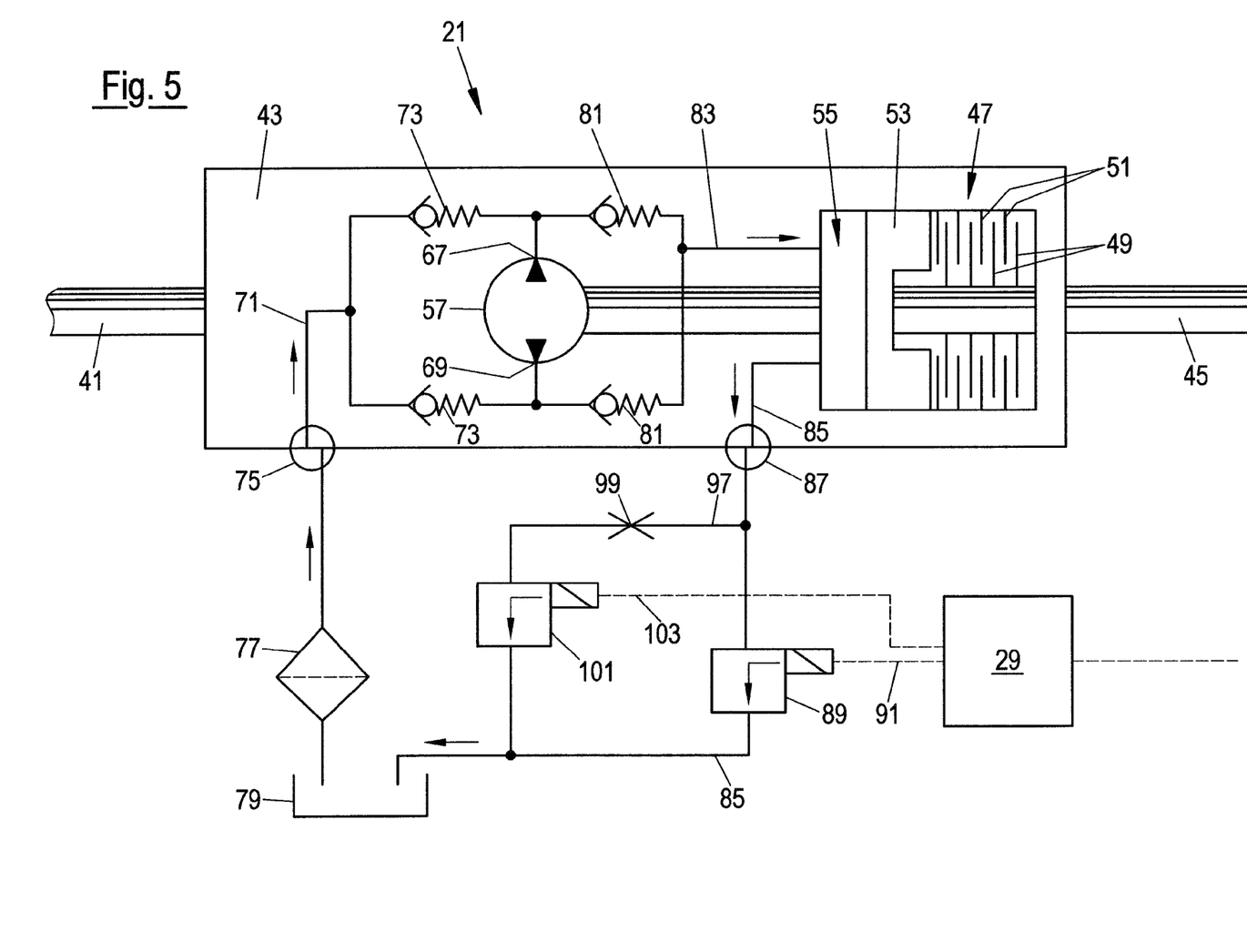
FIG. 5 shows a second embodiment of a clutch arrangement.

A second configuration of a clutch arrangement 21 in accordance with FIG. 1 will be explained in the following with reference to FIG. 5. FIG. 5 in turn shows, in schematic representation, a clutch arrangement 21, with the same or similar elements as in FIG. 2 being marked by the same reference numerals. For example, input shaft 41, output shaft 45, and pump 57 are also provided with pump 57 being rotationally effectively coupled to input shaft 41 and to output shaft 45 and being responsive to a speed difference. Friction clutch 47 is also provided, which rotationally effectively couples output shaft 45 to input shaft 41 in dependence on hydraulic pressure generated by pump 57. Clutch arrangement 21 in accordance with FIG. 5 also has hydraulic pressure space 55, which is connected to sump 79 via drain line 85.

Drain valve 89 is also arranged along drain line 85 in FIG. 5 and is controlled by control unit 29 to selectively connect pressure space 55 to sump 79 or to interrupt the connection. In addition, leakage line 97 is provided parallel to drain valve 89, on the one hand, and parallel to intake line 71, to pump 57 and to pressure line 83, on the other hand, which connects pressure space 55 via orifice 99 to sump 79, with orifice 99 having a substantially independent leakage characteristic.

In contrast to the configuration of FIG. 2, a switch valve 101 is arranged along leakage line 97—and in series with orifice 99. Switch valve 101 may be a magnetic valve that is controllable by control unit 29 via an electrical control line 103 to selectively close or release leakage line 97. With open switch valve 101, orifice 99 effects a temperature compensation of the leakage rate of pump 57 as explained in connection with FIG. 2. By closing switch valve 101, in contrast, an additional (third) clutch characteristic of clutch arrangement 21 may selectively be set. This will be explained in the following with reference to FIG. 6.

Figure 6:
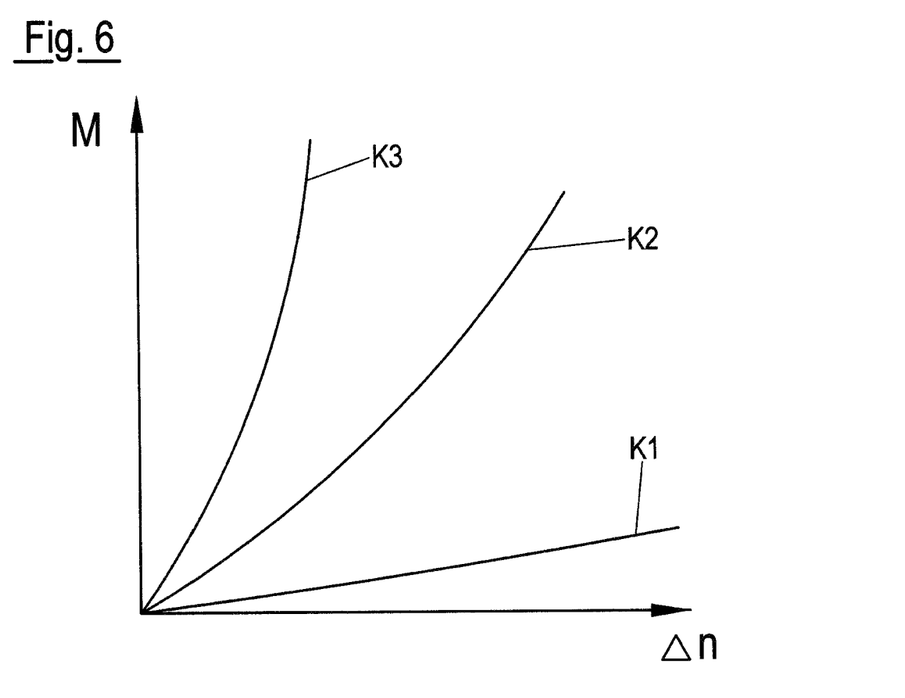
FIG. 6 shows the clutch characteristics which can be set with the embodiment in accordance with FIG. 5.

FIG. 6 shows dependence of the torque M transmitted by clutch arrangement 21 in accordance with FIG. 5 on the speed difference Δn between input shaft 41 and output shaft 45. The flat clutch characteristic K1 with open drain valve 89 and the clutch characteristic K2 with closed drain valve 89 are shown, with leakage line 97, however, being released (i.e., switch valve 101 is open). For better clarity, only the ideal curve of the characteristic K2 is shown in FIG. 6, without the curves K2LT and K2HT.

Leakage flow along the leakage line 97 may be interrupted by closing switch valve 101 so that when a given speed difference is present between input shaft 41 and output shaft 45, an even stronger hydraulic pressure can build up in pressure space 55. An even steeper curve of the corresponding clutch characteristic K3 hereby results with respect to the characteristic K2 (i.e., a higher torque is now transmitted at a given speed difference Δn between input shaft 41 and output shaft 45). The characteristic K3 is admittedly generally dependent on the temperature of the hydraulic fluid (not shown in FIG. 6). However, the clutch characteristic K3 is comparatively steep (restricted only by the inner pump leakage), which corresponds to a maximum traction and tension of the powertrain so that a temperature compensation be omitted with the characteristic K3. The transition from the characteristic K3 to the characteristic K2 nevertheless takes place harmoniously due to orifice 99, with the characteristic K2 being available as an "intermediate characteristic" for a further transition to the characteristic K1. The characteristic K2 may in turn be designed such that, at a speed difference Δn=0, the hydraulic pressure in pressure space 55 may be reduced rapidly so that a switch may be made fast and without an expansion reversal to 2WD operation (high shunting comfort) by opening drain valve 89 (transition to the characteristic K1).

Thanks to the possibility of setting two differently steep clutch characteristics K2 and K3, in addition to the flat characteristic K1, with clutch arrangement 21 responsive to a speed difference, clutch arrangement 21 may effect an improved traction of the powertrain (stiff characteristic K3), while at the same time shunting comfort is increased while avoiding expansion reversals (transition via soft characteristic K2 to characteristic K1). The characteristic K2 may be made comparatively flat with respect to the configuration of FIGS. 2 and 4 by the provision of the additional characteristic K3 to enable a jolt-free transition from the characteristic K2 to the characteristic K1. The damping effect of orifice 99 is also of advantage since it is possible to switch over from the steep characteristic K3 to the flat characteristic K2 under all driving conditions without thereby effecting an undesirably high load reversal.

Finally, different possibilities of controlling drain valve 89 and, optionally, switch valve 101 in accordance with FIGS. 2 and 5 should be explained in the following.

It must first be noted in this respect that control unit 29 may generally be a fixed component of clutch arrangement 21. It is, however, also possible for control unit 29 to be made separately from clutch arrangement 21 or to be a part of a dynamic driving regulation unit of the vehicle that is present. It will be assumed by way of example in the following that control unit 29 is made separately from the dynamic driving regulation unit, but is connected to it. Control unit 29 is furthermore connected to wheel speed sensors 31 (FIG. 1) (e.g., via a bus system of the vehicle or via the named dynamic driving regulation unit of the vehicle).

Provided drain valve 89 is present (FIGS. 2 and 5), control unit 29 may be made to selectively open drain valve 89 to set a flat clutch line K1 or to close drain valve 89 to set a clutch characteristic K2, K3 which is much steeper than the named flat clutch characteristic K1.

An opening of drain valve 89 takes place, for example, when control unit 29 determines with reference to the signals of wheel speed sensors 31 and on the basis of a corresponding model calculation that a substantial torque is no longer being transmitted from input shaft 41 to output shaft 45. Alternatively or additionally, control unit 29 opens drain valve 89 when a dynamic driving intervention (e.g., an activity of an electronic stability program (ESP)) is signaled by the dynamic driving regulation unit of the vehicle. Cut-off valve 89 is closed, for example, when the speed difference between input shaft 41 and output shaft 45 exceeds a predetermined threshold value.

Provided drain valve 89 is present in drain line 85 and, additionally, switch valve 101 is present in leakage line 97 (FIG. 5), control unit 29 may be made, for example, to selectively open drain valve 89 to set a first clutch characteristic K1 or to close drain valve 89 and to open switch valve 101 to set a second clutch characteristic K2, which is temperature compensated due to orifice 99 and which is much steeper than the first clutch characteristic K1, or to close drain valve 89 and switch valve 101 to set a third clutch characteristic K3, which is even steeper than the named second clutch characteristic K2. Three different clutch characteristics may thus be set selectively and in dependence on the current driving state of the vehicle.

Starting from a state in which drain valve 89 and switch valve 101 are closed, there is generally the risk of a load reversal if friction clutch 47 should be opened. In this state, the comparatively steep clutch characteristic K3 is set (i.e., even with low difference speeds Δn), a high torque M is still transmitted from input shaft 41 to output shaft 45. It is, therefore, preferred for control unit 29 to be made, starting from the state, to first open switch valve 101 to effect a transition from the third clutch characteristic K3 to the second, less steep clutch characteristic K2 and only then to open drain valve 89 to effect a transition from the named second clutch characteristic K2 to the first, flat clutch characteristic K1.

Clutch arrangement 21 may also be in a state in which drain valve 89 and switch valve 101 are open. To set a high torque transmission starting from this state, control unit 29 may be made to first close drain valve 89 when a speed difference Δn between input shaft 41 and output shaft 45 exceeds a first threshold value and then to close switch valve 101 if a speed difference Δn between input shaft 41 and output shaft 45 exceeds a second threshold value, which is higher than the named first threshold value. Starting from the flat clutch characteristic K1, the clutch characteristics K2 and K3 in accordance with FIG. 6 are thus set sequentially in dependence on the speed difference Δn.

It must still be noted that the aforesaid switch criteria only represent minimum criteria. Additional criteria may also have to be taken into consideration, e.g. the actuation of a LOCK switch by the driver to close or keep closed drain valve 89 and switch valve 101 independently of a measured speed difference Δn. The respective speed difference Δn between input shaft 41 and output shaft 45 does not have to determined directly, but it is rather determined by control unit 29 from the signals of wheel speed sensors 31 (FIG. 1).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A clutch arrangement responsive to a speed difference for the transmission of torque in a powertrain of a motor vehicle, comprising:
   an input element and an output element that are rotatable relative to one another;
   a friction clutch that couples the input element to the output element based on a hydraulic pressure that prevails in a pressure space;
   a pump with a first pump part that is rotationally fixedly connected to the input element and a second pump part that is rotationally fixedly connected to the output element, wherein the pump is driven by rotation of the input element and the output element relative to one another, a suction side of the pump being connected to a low pressure space, and a pressure side of the pump being connected to the pressure space; and
   an orifice with a substantially temperature independent leakage characteristic arranged at a leakage line that leads from the pressure space to the low pressure space and extends parallel to the pump, the orifice having a leakage rate that approximately corresponds to a leakage rate of the pump at an operating temperature.

2. The clutch arrangement in accordance with claim 1, wherein the orifice has an opening passage which has an inner diameter in a range from approximately 0.4 mm to 0.8 mm and a length in a range from approximately 0.2 mm to 0.5 mm.

3. The clutch arrangement in accordance with claim 1, wherein the orifice is formed by one of a bore in a disk which is inserted into the leakage line and a bore in a base section of a beaker-shaped insert which is inserted into the leakage line.

4. The clutch arrangement in accordance with claim 1, wherein the orifice is arranged in a stationary housing.

5. The clutch arrangement in accordance with claim 1, further comprising a drain line that leads from the pressure space to the low pressure space and extends parallel to the leakage line, and at which a controllable drain valve is arranged for opening or closing the drain line.

6. The clutch arrangement in accordance with claim 5, further comprising a control device that opens the drain valve to set a first clutch characteristic (K1); and
   closes the drain valve to set a second clutch characteristic (K2) which is steeper than the first clutch characteristic.

7. The clutch arrangement in accordance with claim 5, further comprising a switch valve arranged at the leakage line in series with the orifice to open or close the leakage line, and wherein a control device
   opens the drain valve to set a first clutch characteristic (K1);
   closes the drain valve and opens the switch valve to set a second clutch characteristic (K2) which is steeper than the first clutch characteristic; and
   closes the drain valve and the switch valve to set a third clutch characteristic (K3) which is steeper than the second clutch characteristic.

8. The clutch arrangement in accordance with claim 7, wherein the control device first opens the switch valve to effect a transition from the third clutch characteristic (K3) to the second clutch characteristic (K2); and
   only then opens the drain valve to effect a transition from the second clutch characteristic (K2) to the first clutch characteristic (K1), to open the friction clutch starting from a state in which the drain valve and the switch valve are closed.

9. The clutch arrangement in accordance with claim 7, wherein the control device first closes the drain valve when a speed difference between the input element and the output element exceeds a first threshold value or when another first switching criterion is satisfied; and
   then closes the switch valve when a speed difference between the input element and the output element exceeds a second threshold value that is higher than the first threshold value or when another second switching criterion is satisfied, to set a stiff clutch characteristic starting from a state in which the drain valve and the switch valve are open.

10. The clutch arrangement in accordance with claim 1, further comprising an excess pressure line at which an excess pressure valve is arranged that extends from the pressure space to the low pressure space.

11. The clutch arrangement in accordance with claim 1, further comprising a switch valve arranged at the leakage line in series with the orifice for opening or closing the leakage line.

12. The clutch arrangement in accordance with claim 11, further comprising a control device that opens the switch valve to set a temperature compensated clutch characteristic; and
   closes the switch valve to set a steeper clutch characteristic than with the open switch valve.

13. A clutch arrangement for use in a motor vehicle having a drive unit, a primary axle permanently driven by the drive unit, and a secondary axle selectively coupled to the drive unit via the clutch arrangement responsive to a speed difference, the clutch arrangement comprising:
   an input element and an output element that are rotatable relative to one another;
   a friction clutch that couples the input element to the output element in dependence on a hydraulic pressure which prevails in a pressure space;
   a pump having a first pump part that is rotationally fixedly connected to the input element and a second pump part that is rotationally fixedly connected to the output element, wherein the pump is driven by rotation of the input element and the output element relative to one another, with a suction side of the pump being connected to a low pressure space, and a pressure side of the pump being connected to the pressure space; and
   an orifice with a substantially temperature independent leakage characteristic arranged at a leakage line that leads from the pressure space to the low pressure space and extends parallel to the pump, wherein the orifice is sized and shaped to generate turbulent flow therethrough.

14. The clutch arrangement of claim 13 further including a drain line extending from the pressure space to the low pressure space in parallel to the leakage line and a drain valve operable to selectively open and close the drain line.

15. The clutch arrangement of claim 14 further including a switch valve arranged at the leakage line in series with the orifice to open or close the leakage line, and wherein a control device opens the drain valve to set a first clutch characteristic (K1);
   closes the drain valve and opens the switch valve to set a second clutch characteristic (K2) which is steeper than the first clutch characteristic; and closes the drain valve and the switch valve to set a third clutch characteristic (K3) which is steeper than the second clutch characteristic.

16. A drive axle assembly including first and second rotatable members, comprising:
   a differential gear;
   a clutch selectively drivingly coupling the first and second rotatable members to transfer torque to the differential gear based on a hydraulic pressure in a pressure space;
   a pump with a first pump part that is rotationally fixedly connected to the first member and a second pump part that is rotationally fixedly connected to the second member,
   wherein the pump is driven by rotation of the first member relative to the second member, a suction side of the pump being connected to a low pressure space, and a pressure side of the pump being connected to the pressure space; and
   a leakage line interconnecting the pressure space and the low pressure space and extending parallel to the pump and including an orifice configured to develop a turbulent flow such that the volume of flow through the orifice is substantially independent of temperature.

17. A clutch arrangement for transferring drive torque in a powertrain of a motor vehicle; comprising:
   first and second rotary members;
   a friction clutch operably coupled between the first and second rotary members;
   a fluid pump operable to pump fluid from a sump to a pressure chamber in response to relative rotation between the first and second rotary members;
   a piston operable to exert a clutch engagement force on the friction clutch proportional to the fluid pressure in the pressure chamber;
   a first flow path with a control valve located between the pressure chamber and the sump;
   a second flow path from the pressure chamber to the sump which is parallel to the first flow path and which includes an orifice configured to generate turbulent flow to provide a leakage rate that is substantially independent of the temperature of the fluid; and
   a control system for controlling actuation of the control valve.

18. The clutch arrangement of claim 17 further including a third flow path from the pressure chamber to the sump and including a pressure limiting valve that is operable to limit the maximum fluid pressure in the pressure chamber.

19. The clutch arrangement of claim 17 further including a second control valve operably disposed in the second flow path between the orifice and the sump, and wherein the control system is operable to control actuation of the first and second control valves.

20. The clutch arrangement of claim 19 wherein the control system is operable to establish at least three different clutch characteristics indicative of a relationship between the magnitude of the drive torque transferred and the speed differential between the first and second rotary members, wherein a first clutch characteristic is established when the first control valve is opened, wherein a second clutch characteristic is established when the first control valve is closed and the second control valve is opened, and wherein a third clutch characteristic is established when the first and second control valves are both closed.

21. The clutch arrangement of claim 20 wherein the control system is operable to open the second control valve to transition from the third clutch characteristic to the second clutch characteristic and subsequently open the first control valve to transition from the second clutch characteristic to the first clutch characteristic.

22. The clutch arrangement of claim 17 wherein the first rotary member is driven by a source of drive torque associated with the powertrain and the second rotary member drives an input to an axle assembly.

23. A clutch arrangement for transmitting torque in a powertrain of a motor vehicle, comprising:
   an input element and an output element that are rotatable relative to one another;
   a friction clutch operable to selectively couple the input element to the output element based on a hydraulic pressure in a pressure space;
   a pump having a first pump part rotatably driven by the input element and a second pump part rotatably driven by the output element such that the pump is driven in response to relative rotation between the input element and the output element, wherein a suction side of the pump is connected to a low pressure space and a discharge side of the pump is connected to the pressure space;
   a leakage line between the pressure space and the low pressure space;
   an orifice with a substantially temperature independent leakage characteristic arranged in the leakage line;
   a drain line that leads from the pressure space to the low pressure space and extends parallel to the leakage line;
   a controllable drain valve operable for selectively opening and closing the drain line;
   a switch valve arranged in the leakage line in series with the orifice and operable to selectively open and close the leakage line; and
   a control device operable to open the drain valve for setting a first clutch characteristic (K1), to close the drain valve and open the switch valve for setting a second clutch characteristic (K2) which is steeper than the first clutch characteristic, and to close the drain valve and the switch valve for setting a third clutch characteristic (K3) which is steeper than the second clutch characteristic.

24. A clutch arrangement for use in a motor vehicle having a drive unit, a primary axle permanently driven by the drive unit and a secondary axle selectively coupled to the drive unit via actuation of the clutch arrangement, the clutch arrangement comprising:
   an input element driven by one of the drive unit and the primary axle;
   an output element driving the secondary axle;
   a friction clutch operable to selectively couple the input element to the output element in dependence on a hydraulic pressure in a pressure space;
   a pump having a first pump part rotatably driven by the input element and a second pump part rotatably driven by the output element such that the pump is driven in response to relative rotation between the input element and the output element, wherein a suction side of the pump is connected to a low pressure space and a discharge side of the pump is connected to the pressure space;
   a leakage line leading from the pressure space to the low pressure space;
   an orifice with a substantially temperature independent leakage characteristic arranged in the leakage line;
   a switch valve arranged in the leakage line in series with the orifice and operable to selectively open and close the leakage line;

a drain line extending from the pressure space to the low pressure space in parallel to the leakage line and a drain valve operable to selectively open and close the drain line; and a control device which opens the drain valve to set a first clutch characteristic (K1), closes the drain valve and opens the switch valve to set a second clutch characteristic (K2) which is steeper than the first clutch characteristic, and closes the drain valve and the switch valve to set a third clutch characteristic (K3) which is steeper than the second clutch characteristic.

* * * * *